May 19, 1925.
H. C. ODEN
MILKING MACHINE
Filed Aug. 14, 1919
1,538,732
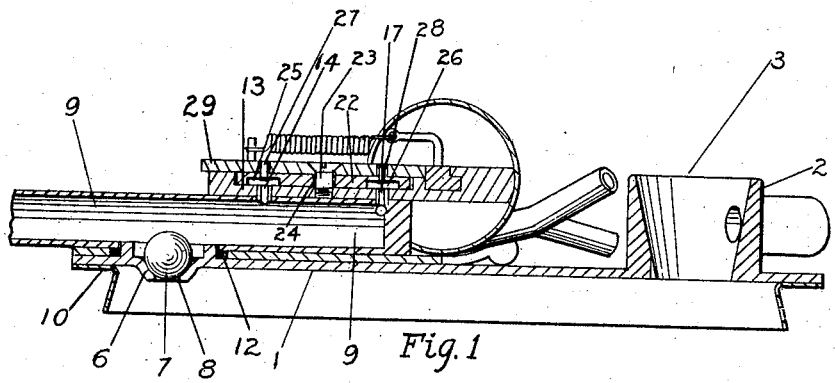
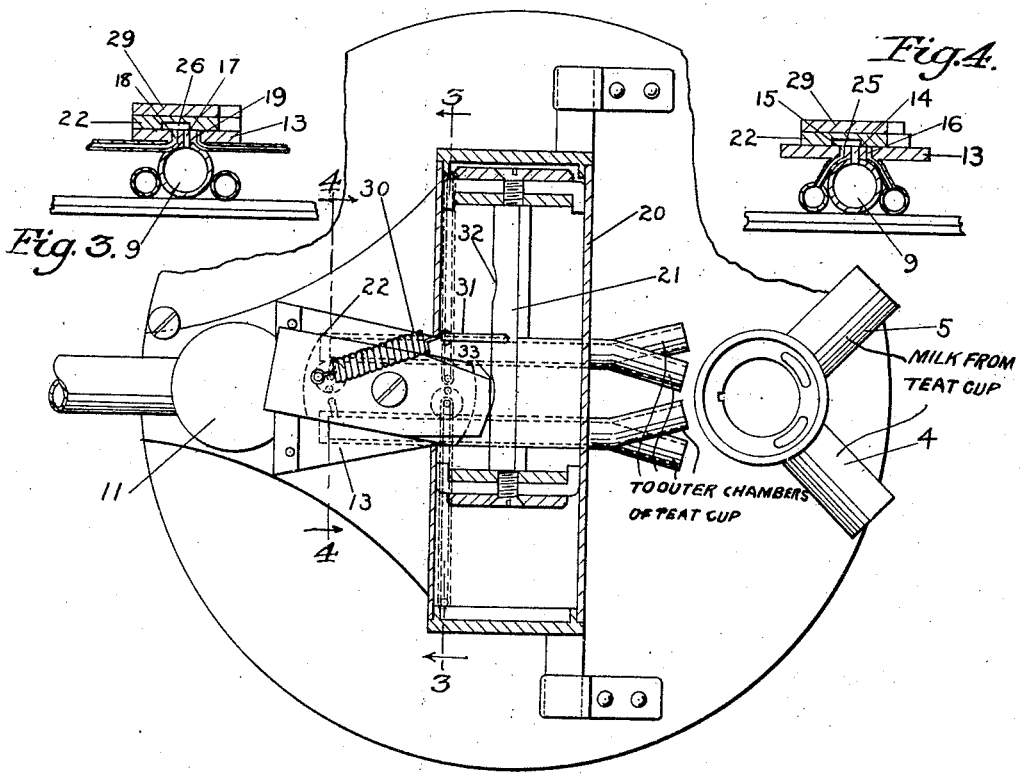
Henry Clyde Oden
INVENTOR.
BY
Edwin P. Corlett
ATTORNEY.

Patented May 19, 1925.

1,538,732

UNITED STATES PATENT OFFICE.

HENRY CLYDE ODEN, OF COLUMBUS, OHIO, ASSIGNOR, BY MESNE ASSIGNMENTS, TO PINE TREE MILKING MACHINE COMPANY.

MILKING MACHINE.

Application filed August 14, 1919. Serial No. 317,418.

*To all whom it may concern:*

Be it known that I, HENRY CLYDE ODEN, a citizen of the United States of America, residing at Columbus, in the county of Franklin and State of Ohio, have invented certain new and useful Improvements in Milking Machines, of which the following is a specification.

My invention relates to milking machines and has particular reference to the provision of a novel and simple construction that will operate directly and efficiently without subjecting the working parts of the apparatus to the milk or to other forms of moisture which may accumulate during the operation of a milking machine. My improvement is particularly applicable to that type of milking machines wherein the teat cups are comprised of an inner chamber, an outer chamber and a flexible end wall separating these chambers, a continuous vacuum being applied to the inner chamber during the process of milking and an intermittent vacuum being applied to the outer chamber to effect a pulsating and massaging action upon the teat.

In the customary structure of milking machines of this type, there is a main vacuum line with a continuous connection to the inner chambers of the teat cups and with a means for effecting an intermittent connection between such main vacuum line and the outer chambers of the teat cups. I have attained this intermittent connection and the adequate control thereof by means of a novel and extremely simple valve structure which operates in conjunction with and in control of a reciprocal device. The valve structure will be set forth in this application in order to make fully apparent the operation of the apparatus but will be claimed in a separate application in view of the fact that it is capable of use with other forms of apparatus.

The present invention has to do particularly with the provision of a means for connecting the main vacuum line continuously to the inner chambers of the teat cups and intermittently to the outer chambers of such teat cups and to different parts of the reciprocating element which controls the vacuum that in turn controls the intermittent application of vacuum to the outer chambers of the teat cups. The present device contemplates the provision of such a series of connections to the main line that the vacuum applied intermittently to the outer chambers of the teat cups is taken from the main vacuum line at a point between the point of connection for the reciprocating element to the main vacuum line and the source of vacuum. More specifically, this connection between the outer chambers of the teat cups and the main line is preferably located in between the point at which the reciprocating device is connected to the main line and the point at which the inner chambers of the teat cups are connected to the main line. The structure shown and described in this application is designed to be used in conjunction with parts similar to those shown and described in the companion applications of applicant numbered and filed respectively S. N. 320,097, August 27, 1919 and S. N. 320,096, August 27, 1919.

The preferred embodiment of my invention is shown in the accompanying drawings wherein similar characters of reference designate corresponding parts and wherein Figure 1 is a transverse section taken through the lid of the milk pail of my apparatus.

Figure 2 is a plan view of the lid of the milk pail with my apparatus applied thereto.

Figure 3 is a section taken on line 3—3 of Figure 2.

Figure 4 is a section taken on line 4—4 of Figure 2.

In the drawings, the lid of the milk pail is shown at 1 as having a spigot connection 2 for the attachment of conduits that extend to the claw of the milking machine and thence to the inner chambers of the teat cups. These conduits are under the control of a spigot or valve element 3 which is rotatable and provided with ports so that either one or both of the conduits 4 and 5 may be connected to the vacuum through the milk pail or so that both of these conduits may be shut off if desired.

Mounted upon the lid of the pail, preferably at a diametrically opposite point, is a check valve structure comprising a perforate depression 6 within which rests a ball valve 7 that may be lifted by vacuum applied from above and that will otherwise rest in the depression 6 and close the opening 8. Extending across the top of the ball valve structure just described is a main vacuum tube or line 9 that is open on its lower side and rests upon the annular flange 10 extending upwardly from the lid of the milk pail in concentric relation to the depression 6. This annular flange 10 is embraced by a cap 11 which is preferably of cylindrical form and which is cut away to permit the passage therethrough of the main vacuum line or pipe 9. This cap 11 rests upon a gasket 12 so as to ensure an air-tight connection. It will be understood that, with this structure, and with the spigot or plug valve 3 in open position, the inner chambers of the teat cups will be continuously subjected to the vacuum from the main line 9 through the opening 8, through the milk pail and through the conduits 4 and 5 by way of the ports in the plug or spigot 3.

The main vacuum line 9 extends entirely through the cap 11 and into snug fitting relation to a valve seat 13 immediately thereabove. It connects two passages through such valve seat and these passages, designated respectively 14 and 17 are preferably comprised of short inset collars of material that is relatively softer than the material of the valve seat. On either side of each of these passages 14 and 17 is another passage. These other passages are designated respectively 15 and 16 and 18 and 19. Passages 14 and 15 are connected by conduits to the outer chambers of the different teat cups, that is, the passage 15 is connected to the outer chamber or outer chambers of one or more teat cups while the passage 16 is connected to the outer chamber or chambers of a different or several teat cups. It is through these passages that the vacuum from the main line is intermittently applied to the outer chambers of the teat cups, the operation being such that vacuum will be applied to the outer chamber of one teat cup or one set of teat cups and then shut off in such a manner as to admit atmospheric air to such outer chamber or chambers. Then, while this outer chamber or these outer chambers are being subjected to atmospheric air, the outer chamber or outer chambers of other teat cups are being subjected to a vacuum.

The passages 18 and 19 which are disposed on opposite sides of the passage 15 are likewise provided with conduits that rise into the cylinder 20 of the reciprocating element and these passages 18 and 19 are designed to be connected alternately with the passage 17 so as to subject opposite sides of the double piston element 21 to vacuum alternately.

A single valve 22 is used for controlling the passages 14, 17, 16 and 17, 18, 19. This valve rests of its own weight upon the valve seat and is held in position by means of a central bolt 23 passing through a central opening 24 in the valve and threaded into the valve seat. The valve is provided upon its under surface with circular depressions 25 and 26, one being located adjacent either end of the valve and in position to cooperate with the passages 14, 15, 16 and 17, 18, 19 as shown best in Figure 1. On the upper side of the valve and preferably extending upwardly in concentric relation to each circular depression are pins 27 and 28 which fit loosely in holes in a superimposed plate 29 likewise held in position by the bolt 23.

The superimposed plate 29 being mounted to swing about the bolt 23 and to carry the valve 22 with it, is caused to so swing by means of a coil spring 30 connected to an arm 31 on the joining rod of the double piston member 21. This joining rod is provided with spaced depressions 32 and 33 and the inner end of the plate 29 is complementally formed to coact with these depressions.

The operation of this valve structure will best be understood by reference to Figure 2. With the parts in this position the application of vacuum through the main line will produce a suction in the near end of the cylinder 20 and the double piston member will then commence to move. Its movement continues until the spring 30 passes the dead center and the inner end of the plate 29 clears the surface between the depressions 32 and 33 and springs into the depression 32. Since this happens at the end of the movement of the double headed piston, the plate 29 is not snapped into its opposite position until this double headed piston is at the end of its stroke. The movement of this plate 29 carries with it the valve 22. The result is that the depression 25 of the valve first connects the passage 14 with the passage 15 and then upon reverse movement the passage 14 with the passage 16. A similar operation occurs at the other end of the valve in that movement of this valve to one position connects the passage 17 with the passage 19 and movement to the opposite position connects the passage 17 to the passage 18. The valve is so shaped that when two of the passages are connected the third passage is open to the atmosphere. With respect to the passages which control the intermittent application of vacuum to the outer chambers of the teat cups, the uncovering of one passage permits the inlet of air to the outer chamber of one teat cup or one set of teat cups while at the same time the outer chamber or chambers of the other teat cup or teat cups are being subjected to vacuum. With respect to the reciprocating device, when two of the passages 17, 18 and 19 are connected together so as to subject one end of the reciprocating element to vacuum, the third of these passages is open to the atmosphere so as to subject the other end of the reciprocating element to atmospheric air.

An important feature of this invention has to do with the connecting of the pulsator passages 14, 15 and 16 to the main vacuum line in between the check valve and the point at which the passages for controlling the reciprocating element are connected to the main vacuum line. For instance, in the event that the flexible wall of the teat cups should split or moisture should otherwise get into the pulsator passage, this moisture would pass through the passages 14, 15 and 16 and through the check valve into the milk pail or at least along the main vacuum line away from the mechanism of the reciprocating element. Thus, this reciprocating element is fully protected from the deleterious influences of any such moisture.

Having thus described by invention, what I claim is:

1. A pulsator for milking machines having conduits for attachment to pulsating teat cups comprising an element reciprocable by fluid pressure, one set of conduits for varying the fluid pressure in said element to effect reciprocation, another set of conduits for varying the fluid pressure in said pulsating teat cups, and controlling means for said sets of conduits, the controlling means for the pulsating cups being interposed between the main vacuum line and the means for controlling the varying of the fluid pressure to effect said reciprocation, so that any moisture leaking into said pulsator conduits will pass to the main vacuum line without reaching said reciprocable element.

2. A pulsator for milking machines having conduits for attachment to pulsating teat cups comprising a connection between the main vacuum line and the inner chambers of said teat cups through the milk pail, each teat cup having a pulsating chamber, in combination with means for intermittently applying vacuum from the main line to said pulsating chambers, an element reciprocable automatically by application of vacuum from the main line, a valve operable by said reciprocable element for controlling the intermittent application of vacuum to said pulsating chambers, the means for intermittently applying the vacuum being connected to the main vacuum line between the main chamber connection and connection of the reciprocable element.

3. A milking machine of the type designed to supply vacuum to the inner and outer chambers of teat cups, comprising a milk pail, a main vacuum line, means for continually connecting the inner chambers of said teat cups through the pail to said main vacuum line, means for intermittently connecting said main vacuum line to the outer chambers of said teat cups, operating mechanism for said last means, means connecting said mechanism to said main vacuum line for operation thereby, the means for intermittently connecting being constructed and operative to effect such connection to said main line at a point between said mechanism connecting means and the source of vacuum.

In testimony whereof I hereby affix my signature.

HENRY CLYDE ODEN.